J. ROSZMANN.
GREASE CUP PLUG.
APPLICATION FILED JULY 19, 1920.
1,430,591. Patented Oct. 3, 1922.
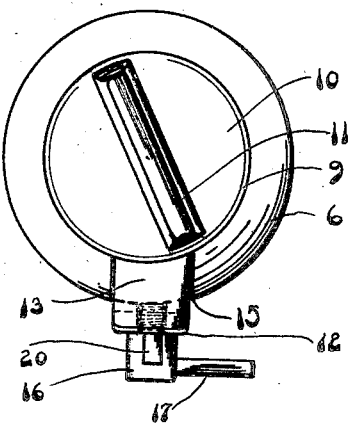
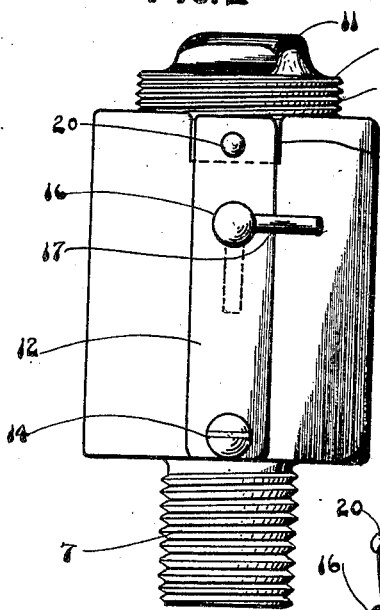
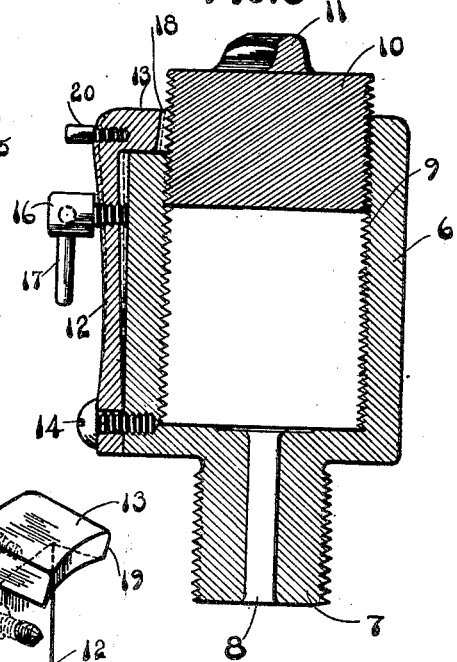
INVENTOR
Joseph Roszmann
By James N. Ramsey
ATTORNEY Patented Oct. 3, 1922.

1,430,591

UNITED STATES PATENT OFFICE.

JOSEPH ROSZMANN, OF COVINGTON, KENTUCKY.

GREASE-CUP PLUG.

Application filed July 19, 1920. Serial No. 397,452.

*To all whom it may concern:*

Be it known that I, JOSEPH ROSZMANN, residing at Covington, in the county of Kenton and State of Kentucky, have invented certain new and useful Improvements in Grease-Cup Plugs, of which the following is a specification.

My invention relates to improvements in lubricating devices wherein grease of a thick character is employed and is adapted to be fed downwardly in the cup to the bearing by occasional turning of the screw plug.

In machinery, such as locomotive crank pin bearings, the vibration imposed upon the ordinary grease cup is severe and results in the frequent loss of grease cup plugs, as well as the grease contained therein. This permits sand, dust and other foreign substances to enter the cup and damage the bearings, all of which results in considerable loss and inconvenience.

The object of my invention is to provide a simple, convenient and efficient locking device adapted to be readily adjusted and to prevent the plug from working loose and becoming lost. Other objects and advantages are also attained as herein set forth.

My invention consists in the construction, combination and arrangement of parts as herein set forth and claimed.

In the drawings:

Fig. 1 is a plan view of a grease cup and plug showing my locking device turned to locked position;

Fig. 2 is a side elevation showing the handle turned to locked position and by dotted lines to unlocked position;

Fig. 3 is a vertical section showing the device in unlocked position, and by dotted lines showing it in locked position; and Fig. 4 is a perspective view of the locking device.

In the embodiment of my invention as illustrated and which shows preferred constructions, the grease cup 6 may be integrally mounted over a bearing (not shown) or may be secured thereon by threaded stem 7 having outlet 8. The grease cup is provided with internal threads 9 extending from top to bottom thereof to receive screw plug 10 which has lug 11 for turning it in or out by hand or wrench.

A spring member 12, having jaw 13, is secured by screw 14 to the side of the cup with the lower edge of the jaw resting in notch 15 in the upper end of the cup to hold the jaw in proper relative position to the cup and plug. A handle screw 16 is mounted in spring member 12 between its ends and preferably near its upper end to engage or release the jaw and threads of the plug. By turning handle 17 downwardly to the position shown in Fig. 4. jaw 13 is withdrawn from engagement with screw plug 10, when the latter may be readily screwed in or out as desired.

Jaw 13 is preferably inclined or beveled inwardly from its top in order to permit the upper projecting edge 18 to extend between the threads of plug 10 and insure against outward movement of the plug when the locking device is in locked position. Said jaw is also transversely concave to form vertical biting edges 19, to more securely impinge the screw plug than otherwise. When it is desired to lock the plug, after it has been adjusted to desired position, simply draw the handle upwardly against stop 20, releasing the tension on the spring and allowing it to force the jaw inwardly into biting engagement with the screw plug. The stop 20 is merely intended to limit the upwardly movement of handle 17.

It will be apparent that my invention is capable of modification without departure from its scope or spirit.

Having described my invention, what I claim as new and desire to secure by Letters Patent is:

1. In a grease cup plug, an internally threaded grease cup having an outlet in its bottom leading to a bearing to be lubricated and having a recess in its upper edge, a spring member attached to the lower end of said cup and having a curved downwardly beveled edge extending into said recess and adapted to engage the threads of said plug and a screw mounted in said spring and engaging said cup adapted to move said jaw into and out of holding engagement with the threads of said plug, substantially as set forth and for the purposes specified.

2. The combination in a grease cup, of an internally threaded plug mounted therein, a locking device comprising a spring member attached to the lower end of said grease cup and having an inwardly extending jaw provided with a curved surface beveled downwardly to engage and disengage the threads of said plug and a handle screw mounted in said spring and adapted to engage the wall of said grease cup to move said jaw into and out of locked position, substantially as set forth and for the purposes specified.

3. In a grease cup plug, an internally threaded grease cup having an outlet in its bottom leading to a bearing to be lubricated, a solid externally threaded plug mounted in said cup and having an elongated transverse rib on its top whereby it may be turned, a spring attached at one end to the lower end of said cup and having an inwardly extending transversely concaved jaw provided with vertical biting edges adapted to impinge the threads of said screw transversely thereof, a handle screw adapted to operate said spring into locked position, and a stop to limit the upward movement of said screw, substantially as set forth and for the purposes specified.

4. In a grease cup plug, a locking device comprising a spring having an inwardly extending jaw transversely concaved to form vertical biting edges and beveled from top to bottom to form a projecting beveled edge adapted to extend between the threads of the screw plug to insure against outward movement of the plug when said locking device is in closed position, substantially as set forth and for the purposes specified.

JOSEPH ROSZMANN.